(12) United States Patent
Endo

(10) Patent No.: US 6,665,038 B2
(45) Date of Patent: Dec. 16, 2003

(54) LIQUID CRYSTAL DISPLAY DEVICE

(75) Inventor: Atsushi Endo, Chiba (JP)

(73) Assignee: Seiko Instruments Inc., Chiba (JP)

( * ) Notice: Subject to any disclaimer, the term of this patent is extended or adjusted under 35 U.S.C. 154(b) by 273 days.

(21) Appl. No.: 09/944,363

(22) Filed: Aug. 31, 2001

(65) Prior Publication Data

US 2002/0047953 A1 Apr. 25, 2002

(51) Int. Cl.$^7$ .............................................. G02F 1/1345
(52) U.S. Cl. ...................... 349/149; 349/61; 349/65; 349/150; 362/26
(58) Field of Search ............................ 349/61, 65, 149, 349/150; 362/26

(56) References Cited

U.S. PATENT DOCUMENTS 6,384,890 B1 * 5/2002 Takiar et al. ............... 349/150
6,414,728 B1 * 7/2002 Faris et al. ................... 349/10
6,414,781 B1 * 7/2002 Saitoh ......................... 359/245
6,417,897 B1 * 7/2002 Hashimoto .................. 349/65

* cited by examiner

Primary Examiner—B. William Baumeister
Assistant Examiner—N. Drew Richards
(74) Attorney, Agent, or Firm—Adams & Wilks

(57) ABSTRACT

A liquid crystal display device is provided, which is applicable to either a back light type or a front light type. For the back light type, a flexible board, a first joint body of a back light transmission plate and a rod-like light transmission body, and a liquid crystal panel are successively piled up from bottom, and a LED is positioned facing to the rod-like light transmission body by bending a spur. For the front light type, a flexible board, a liquid crystal panel, and a second joint body of a front light transmission plate and a rod-like light transmission body, having the same shape as the first joint body, are successively piled up from bottom, and a LED is positioned facing to the rod-like light transmission body by bending a spur.

14 Claims, 7 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device, which is applicable to either a back light type or a front light type.

2. Description of the Related Art

Generally, depending on the illumination method used to illuminate a liquid crystal panel with a light, two types of liquid crystal display devices, a back light type and a front light type, are known. The structure of a back light type liquid crystal display is, as shown in FIG. 6, such that a back light liquid crystal and board unit 30, made by stacking a circuit board 31 equipped with LEDs 36, a back light transmission plate 32 located to contact with the LEDs 36, and a liquid crystal panel 34 successively from the bottom, and is supported in a device box which is not shown in the figure.

On the other hand, the structure of a front light type liquid crystal display is, as shown in FIG. 7, such that a front light liquid crystal and board unit 20, made by stacking a circuit board 41, a liquid crystal panel 44, and a joint body of a front light transmission plate 42 and a rod-like light transmission body 43 successively from bottom, and in which the LEDs 46 connected to a lead wire 47 are positioned facing the rod-like light transmission body 43, and is supported in a device box which is not shown in the figure.

However, because the back light type and the front light type have completely different structures, the outer dimensions of the liquid crystal display device cannot be made common. To be more precise, the above conventional back light type liquid crystal display device is thicker because it has the LEDs and other components on a circuit board located under the transmission plate. On the other hand, the above conventional front light type liquid crystal display device needs additional wiring to supply power to the LEDs and other components because the LEDs are located to contact with the rod-like light transmission body and the transmission plate which is placed at the top.

Therefore, the outer dimensions of the conventional liquid crystal display device of a back light type and a front light type cannot be made common, and there is a problem of limitations in the design and the manufacturing steps. For example, when the device is designed and manufactured to fit either one of the types, even though it can be manufactured with a small size, it may have to be made larger to fit the other type, or additional supporting parts may be required to install the device in the device box. It is not efficient to manufacture such device.

SUMMARY OF THE INVENTION

The present invention exemplifies the above, and an object of the present invention is to provide a liquid crystal display device, which is applicable to either a back light type or a front light type.

In order to achieve the above object, the present invention provides a liquid crystal display device, characterized by comprising:

a liquid crystal panel having a display screen for displaying information by changing the intensity of a transmitted light, which takes place when the molecular sequence of a liquid crystal injected between two glass plates is changed by an applied voltage;

a back light transmission plate or a front light transmission plate that transmits a light, which illuminates the liquid crystal panel;

a board that applies voltage to the liquid crystal panel and has various wiring patterns;

a spur that projects from the board as a single unit and has various wiring patterns; and a luminous body that is connected to a fitting wire on the spur, and characterized in that a unit made by piling up a board, a back light transmission plate, and a liquid crystal panel successively from bottom, or a unit made by piling a board, a liquid crystal panel, and a front light transmission plate successively from bottom is assembled and then the spur is bent and maintained at a position where a light is transmitted from the luminous body to the back light transmission plate or the front light transmission plate.

Therefore by stacking the board, the back light transmission plate, and the liquid crystal panel successively from the bottom, bending the spur, and then locating the luminous body at a position where light is transmitted to the back light transmission plate, a back light unit can be assembled. On the other hand, by stacking the board, the liquid crystal panel, and the front light transmission plate successively from the bottom, bending the spur, and then locating the luminous body at a position where light is transmitted to the front light transmission plate, a front light unit can be assembled.

Moreover, the liquid crystal display in the present invention has an assisted light transmission body, which transmits a light and is connected to the back light transmission plate or the front light transmission plate. It is preferable to have the spur bent and maintained at a position where the assisted light transmission body and the luminous body are facing each other in order to transmit a light from the luminous body to the assisted light transmission body.

Therefore, by stacking the liquid crystal panel, the back light transmission plate, and the board successively from the top and beginning the spur to a position where the luminous body is facing the assisted light transmission body, a back light unit can be assembled. On the other hand, by stacking the front light transmission plate, the liquid crystal panel, and the board successively from the top and bending the spur to a position where the luminous body is facing the assisted light transmission body, a front light unit can be assembled.

Moreover, the board is a laminated body having a film-like substrate and a conductor such as a copper film to form wiring patterns. It is preferable to have the spur molded together with the board as one body. It is also acceptable for the board and the spur to be soldered together as one body. Moreover, it is preferable to have each unit built in a device box, which has the same planer dimension and thickness.

DETAILED DESCRIPTION OF THE PREFERRED EMBODIMENTS

Hereafter, the present invention is explained in detail by referring to the figures. The present invention is not limited to the present embodiment.

Figure 1:
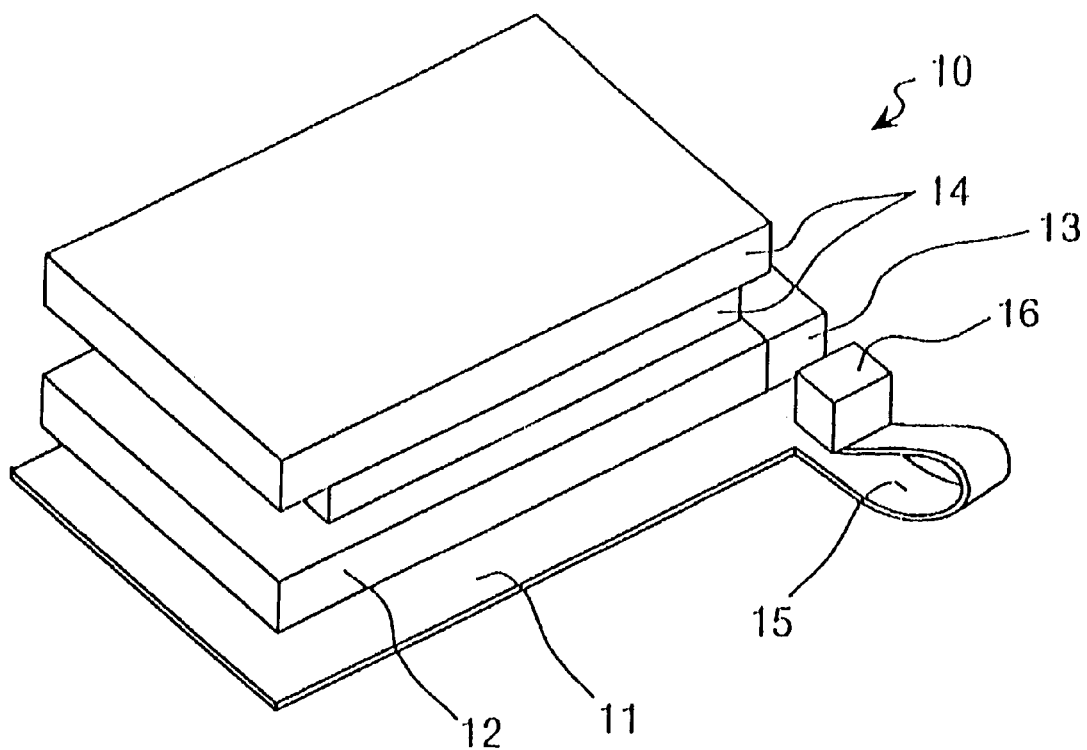
FIG. 1 is a perspective view explaining a back light type liquid crystal display device according to the embodiment of the present invention.
Figure 2:
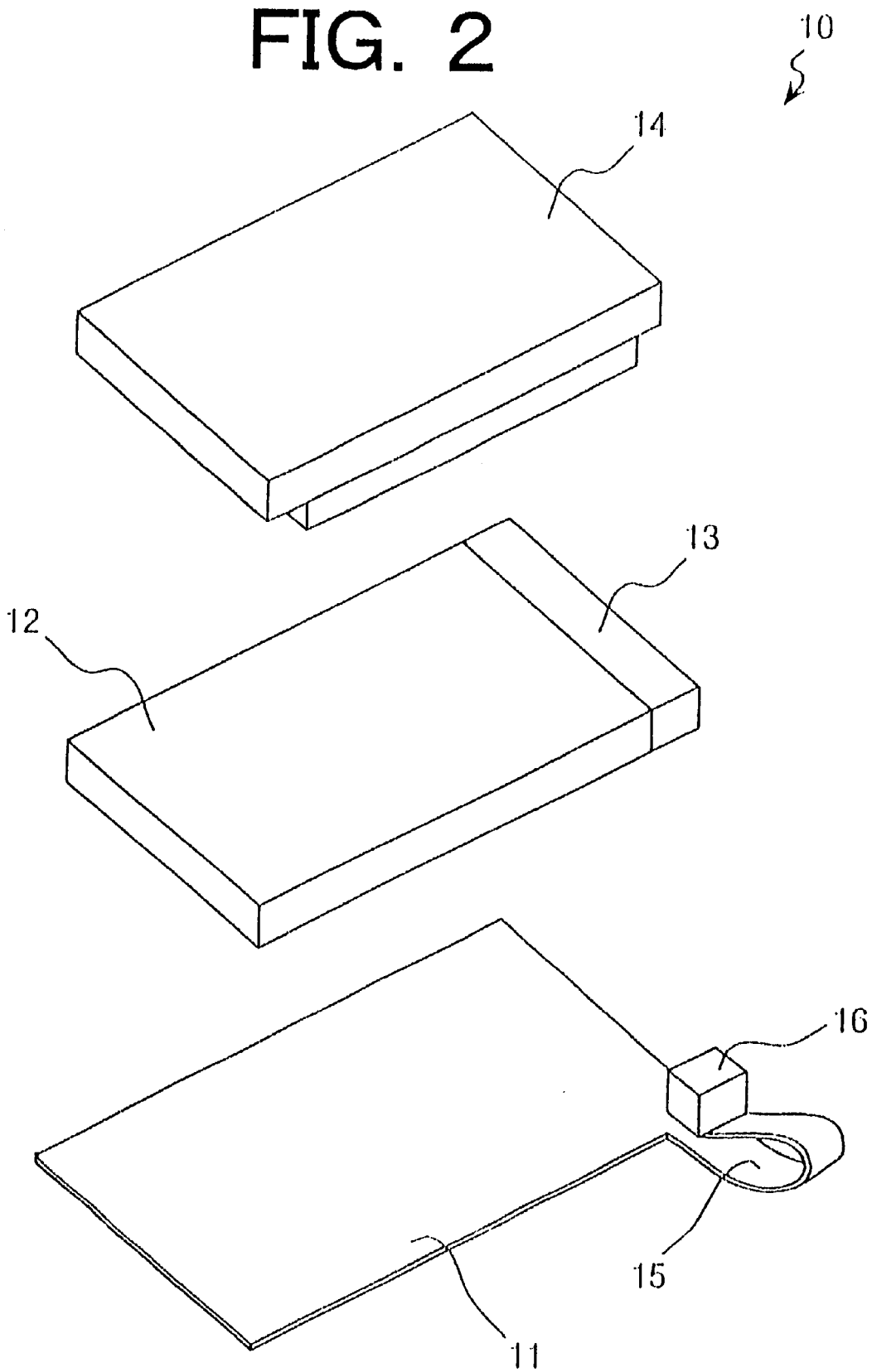
FIG. 2 is an exploded perspective view of the liquid crystal display device shown in FIG. 1.

FIG. 1 is a perspective view explaining a back light type liquid crystal display device according to the embodiment of the present invention. FIG. 2 is an exploded perspective view of the liquid crystal display device shown in FIG. 1. This liquid crystal display device has a structure in which a back light liquid crystal and board unit 10 is supported in a device box, which is not shown in the figures.

The back light liquid crystal and board unit 10 has the following main parts; a flexible board 11, a back light transmission body 12, a rod-like light transmission body 13, a liquid crystal panel 14, a spur 15, and a LED 16. The unit is made to function as a display device of various types by piling up the flexible board 11, a joint body of the back light transmission plate 12 and the rod-like light transmission body 13, and the liquid crystal panel 14 successively from bottom, bending the spur 15 so that the LED 16 faces to the rod-like light transmission body 13, and then supporting the unit in a device box which is not shown in the figure.

Moreover, the back light liquid crystal and board unit 10 is supported, for example, by an attachment means such as screwing, a caulking curing adhesive, or a UV curing adhesive. Whether the rod-like light transmission body 13 and the LED 16 should be in contact each other or not is determined by the optical design. The LED 16 may instead be embedded in a hollow formed in the rod-like light transmission body 13 or buried in the rod-like light transmission body 13, such variations being included in the case of the rod-like light transmission body 13 and the LED 16 being in contact with each other.

The flexible board 11 is a circuit board formed by laminating a material such as copper foil as wiring on a polyimide film layer as a substrate, and the spur 15 is formed with the board 11 as one body. The back light transmission plate 12 has a microstructure, which has a characteristic to illuminate the liquid crystal panel 14 with a light from behind. The rod-like light transmission body 13 is connected to the back light transmission plate 12, forming with the back light transmission plate 12 one body, and has a characteristic to transmit a light uniformly to the back light transmission plate 12. Moreover, the shape of the rod-like transmission body 13 can be, for example, a shape with a tapered surface, a rectangular parallelepiped, or a shape with a curved surface, as determined by the optical design.

The liquid crystal panel 14 has a function that displays an image by changing the intensity of a transmitted light, which takes place when a molecular sequence of a liquid crystal injected between two glass plates is changed by an applied voltage. Here, the spur 15 is formed with the flexible board 11 as one body as described above, and is formed as a projected part of the flexible board 11, so that the spur 15 comprises a flexible extension portion of the circuit board 11. That is, the spur 15 has a wiring pattern formed by laminating a conductor such as a copper foil on a polyimide film layer as a substrate, and the LED 16 connects to the wiring pattern.

The LED 16 is a light-emitting diode attached onto the spur 15. It can be luminous body other than a light-emitting diode. Other luminous bodies, for example, are the so-called light bulb, a semiconductor laser, a fluorescent tube, an inorganic electroluminescence element, and an organic electroluminescence element.

Figure 3:
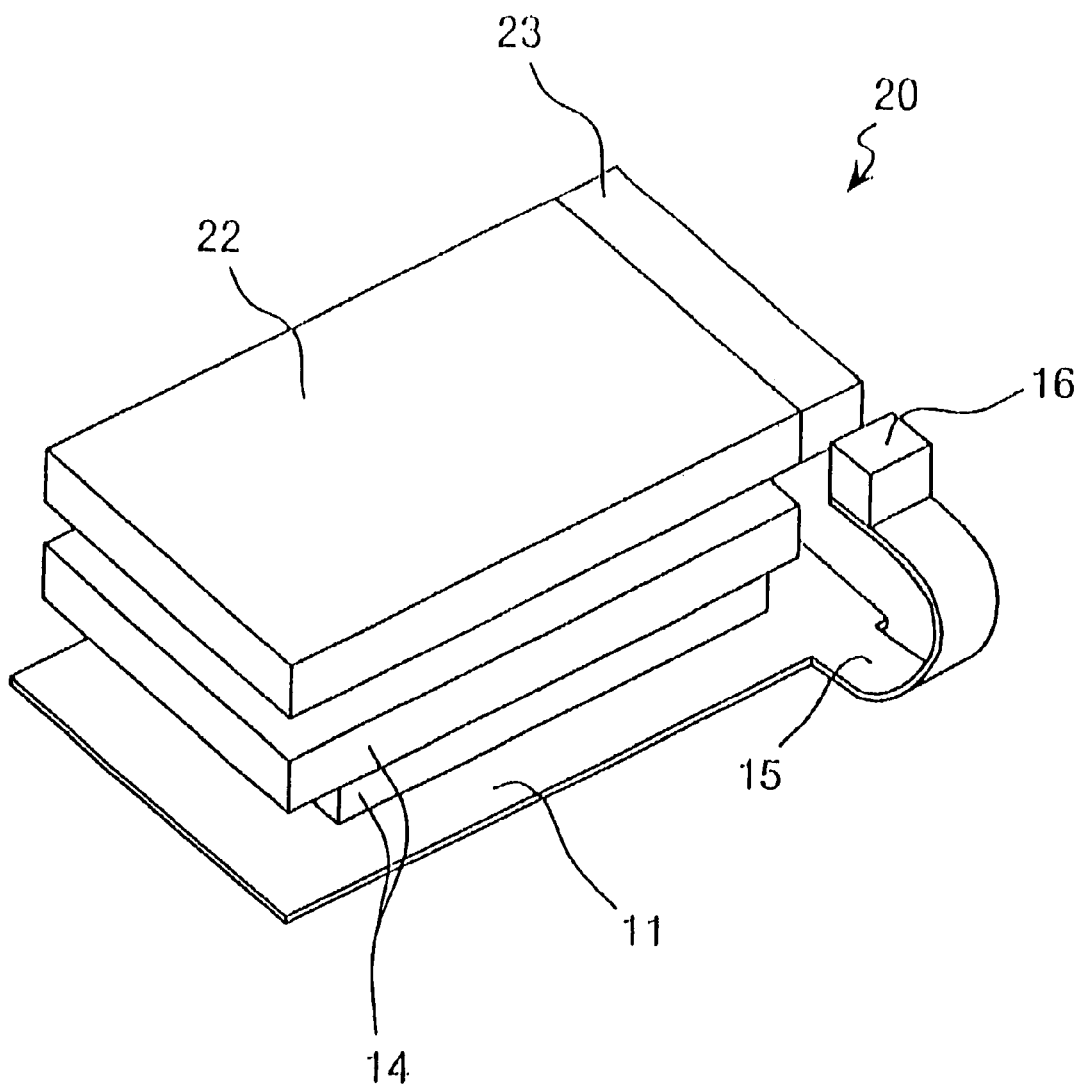
FIG. 3 is a perspective view explaining a front light type liquid crystal display device according to the embodiment of the present invention.
Figure 4:
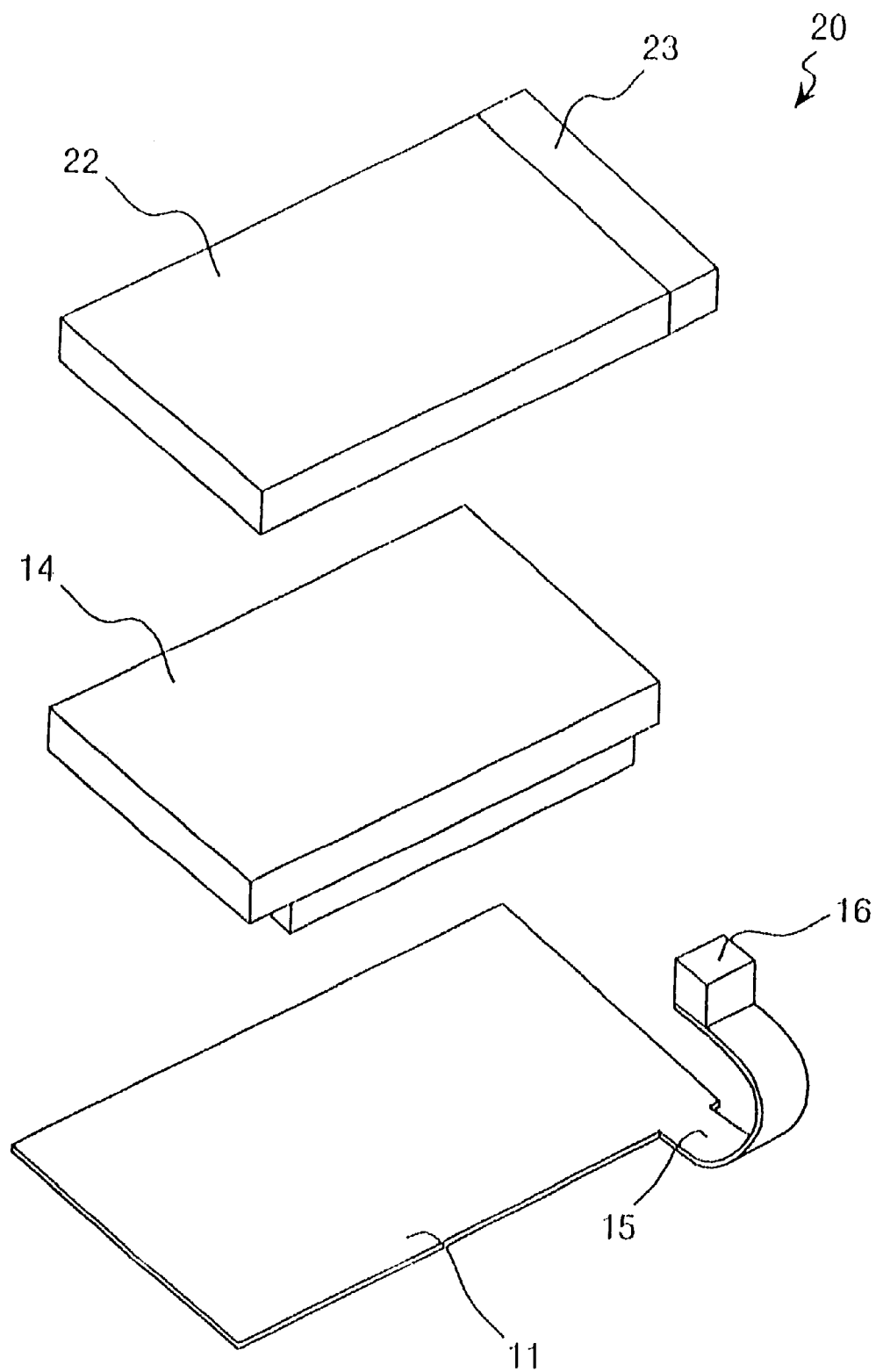
FIG. 4 is an exploded perspective view of the liquid crystal display device shown in FIG. 3.

Next, a front light type liquid crystal display device according to the embodiment of the present invention is explained. FIG. 3 is a perspective view explaining a front light type liquid crystal display device according to the embodiment of the present invention. FIG. 4 is an exploded perspective view of the liquid crystal display device shown in FIG. 3. This liquid crystal display device has a structure such that a front light liquid crystal and board unit 20 is supported in a device box, which is not shown in the figures.

The front light liquid crystal and board unit 20 has the following main parts; a flexible board 11, a liquid crystal panel 14, a spur 15, a LED 16, a front light transmission body 22, and a rod-like light transmission body 23. The unit is made to function as a display device of various types by piling up the flexible board 11, the liquid crystal panel 14, and a joint body of the front light transmission plate 22 and the rod-like light transmission body 23 successively from bottom, bending the spur 15 so that the LED 16 faces to the rod-like light transmission body 23, and then supporting the unit in a device box which is not shown in the figure.

Moreover, the front light liquid crystal and board unit 20 is supported, the same as the back light liquid crystal and board unit 10, for example, by an attachment mean such as screwing, a caulking curing adhesive, or a UV curing adhesive. Whether the rod-like light transmission body 23 and a LED 16 should be contacted with each other or not is determined by the optical design. The case of the LED 16 being embedded in a hollow formed in the rod-like light transmission body 23 and the case of the LED 16 being buried into the rod-like light transmission body 23 are included in the case of the rod-like light transmission body 23 and the LED 16 being contacted with each other.

The front light transmission plate 22 has a microstructure which has characteristics to transmit a light from the LED 16 to the liquid crystal panel 14 side, and then to transmit a light reflected from the liquid crystal panel 14 to the observer's direction as well. The rod-like light transmission body 23 is connected to the front light transmission plate 22, formed with the front light transmission plate 22 as one body, and has a characteristic to transmit a light uniformly to the front light transmission plate 22. Moreover, the shape of the rod-like transmission body 23 can be, for example, either a shape with a tapered surface, a rectangular parallelepiped, or a shape with a curved surface, as determined by the optical design.

Now, the flexible board 11, the liquid crystal panel 14, the spur 15, and the LED 16 including this front light liquid crystal and board unit 20 are the same as each part having the same reference numeral including the back light liquid crystal and board unit 10. On the other hand, there are differences between the back light liquid crystal and board unit 10 and the front light liquid crystal and board unit 20 in the composition of the joint body of the back light transmission plate 12 and the rod-like light transmission body 13 and that of the front light transmission plate 22 and the rod-like light transmission body 23, and in the sequence of piling up each part, and in the condition of bending the spur 15.

Therefore, because the above back light liquid crystal and board unit 10 and the above front light liquid crystal and board unit 20 use flexible board 11, liquid crystal panel 14, spur 15, and LED 16 which have the same shape and size, and because the joint body of a back light transmission plate 12 and a rod-like light transmission body 13 and that of a front light transmission plate 22 and a rod-like light transmission body 23 have the same unified shape and size, both of the units can be supported in the same device box.

Figure 5A:
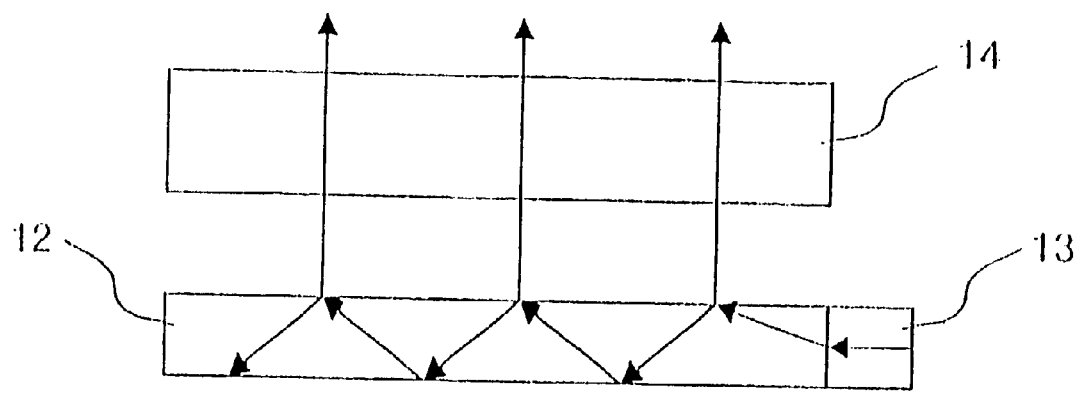
FIGS. 5A and 5B are typical drawings explaining a light path of a liquid crystal display device in the present invention.
Figure 5B:
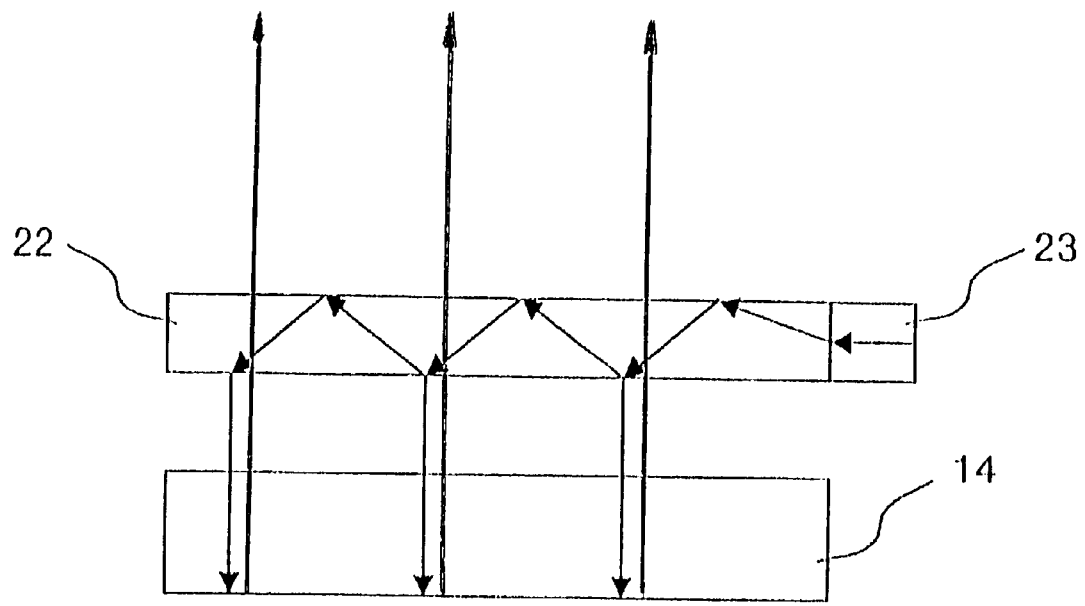
Figure 6:
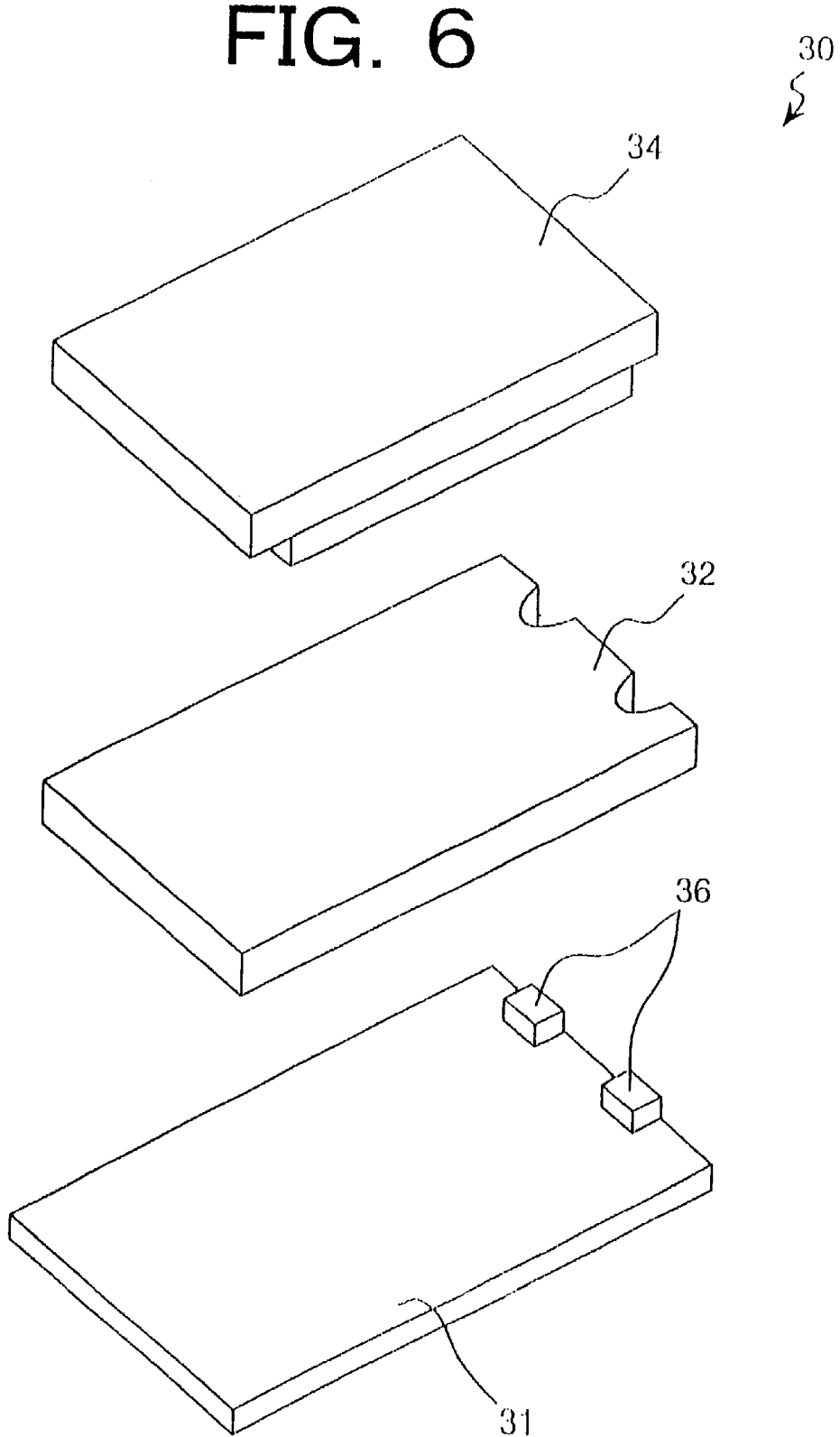
FIG. 6 is an exploded perspective view explaining a conventional back light type liquid crystal display device.
Figure 7:
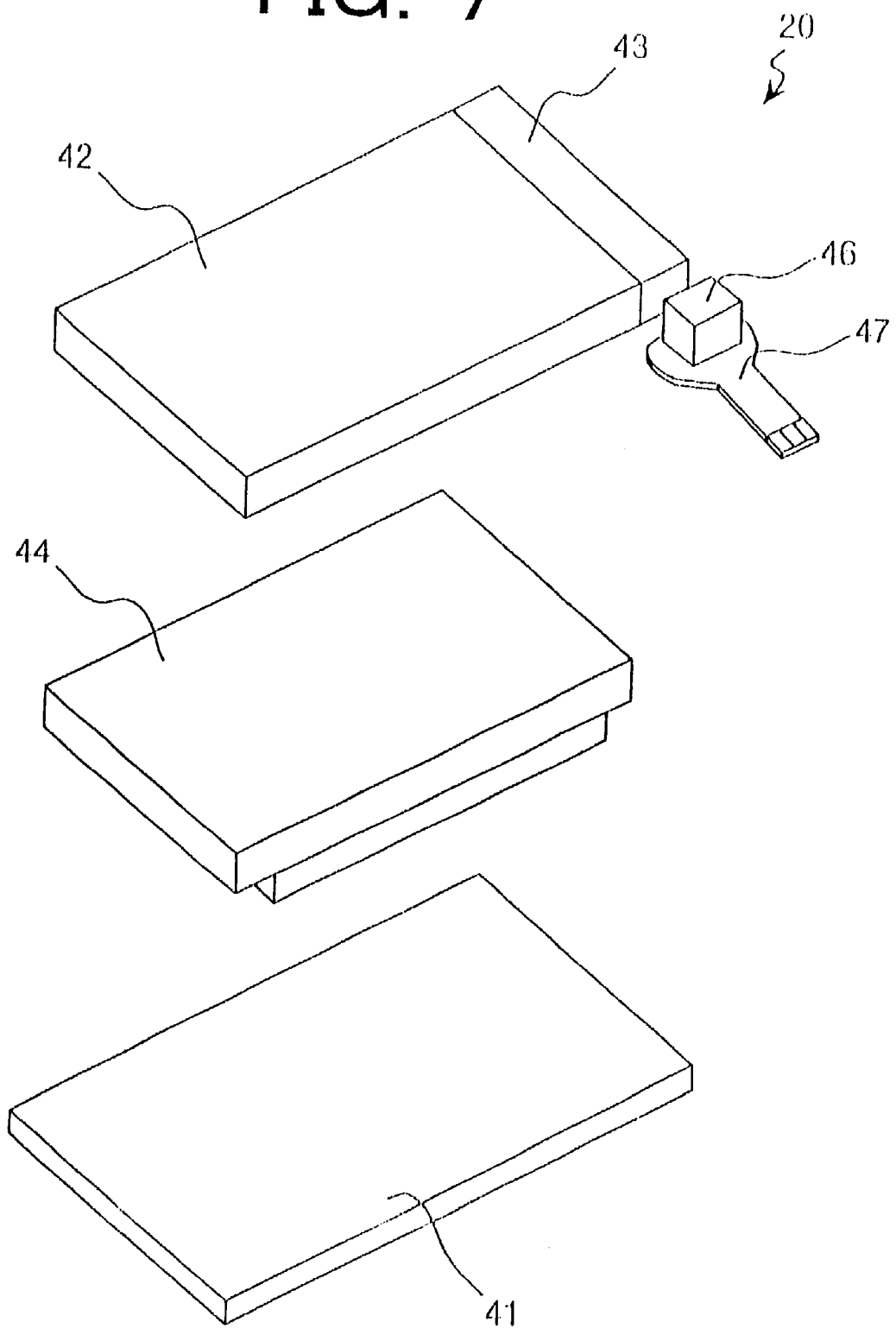
FIG. 7 is an exploded perspective view explaining a conventional front light type liquid crystal display device.

Here, the light path of the back light type and the front light type liquid crystal display device in the present invention is explained. FIGS. 5A and 5B are typical drawings explaining the light path of a liquid crystal display device in the present invention. In the figure, FIG. 5A is for the back light type and FIG. 5B is for the front light type. The LED, not shown in the figure, is placed at the side of the figure facing the rod-like light transmission body 13 and 23.

For the back light type, as shown in FIG. 5A, the incident light from the side of the figure facing the rod-like light transmission body 13 is transmitted into the back light transmission plate 12, and from the back light transmission plate 12, the light is incident onto the liquid crystal panel 14. At this time, depending on the voltage changes, the molecular sequence of a liquid crystal in the liquid crystal panel 14 changes, and then the intensity of the transmitted light changes to display a screen to the observer. On the other hand, for the front light type, as shown in FIG. 5B, the incident light from the side of the figure facing the rod-like light transmission body 23 is transmitted into the front light transmission plate 22, and from the front light transmission plate 22, the light is incident onto the liquid crystal panel 14. Then, the incident light to the liquid crystal panel 14 is reflected and transmitted into the front light transmission plate 22. At this time, depending on the voltage changes, the molecular sequence of a liquid crystal in the liquid crystal panel 14 changes, and then the intensity of the transmitted light changes to display a screen to the observer.

According to the above embodiment, by mounting a luminous body such as a LED on a spur of the flexible board, a wire connection portion to supply power to the LED is unnecessary and the manufacturing step can be simplified substantially. Moreover, because the outer dimension of the back light type and the front light type liquid crystal display device can be made in common, the same device box to put the liquid crystal display in can be used. Moreover, it becomes possible to rearrange a liquid crystal display device to be used as a back light type or a front light type depending on the user's needs and variations of the product can be implemented easily.

Accordingly, for a liquid crystal display device in the above embodiment, because the same device box to put the unit in can be used, parts design and manufacturing can be versatile. Therefore, the above embodiment can provide a liquid crystal display device, which is applicable to either a back light type or a front light type.

Moreover, in the above embodiment, polymide is explained as a film layer material for a flexible board substrate from the insulation, the heat resistance, the chemical resistance, and the mechanical strength view points. However, materials other than polymide can be used as the film layer. Moreover, in the above embodiment, the spur which is formed as one body with the flexible board as a circuit board is explained. However, the spur portion can be made from another flexible board and the spur portion can be soldered to the flexible board as a circuit board.

Moreover, in the above embodiment, a flexible board is explained as a circuit board. However, it is not limited to a flexible board, and for example, a glass epoxy board can be used. In this case, it is preferable to make a spur portion from a flexible board and then to solder it to a glass epoxy board as a circuit board. Moreover, the spur portion can be made from a glass epoxy board etc. into a shape which is necessary to face each rod-like light transmission body of the back light transmission plate or the front light transmission plate, and then soldered to a circuit board such as a flexible board.

Moreover, in the above embodiment, a light is transmitted from a LED through each rod-like light transmission body connected to the back light transmission plate or a front light transmission plate. However, without using a rod-like light transmission body, the spur can be positioned at where the light is directly transmitted to the back light transmission plate or the front light transmission plate. For example, the spur can be bent so that the LED is positioned on the flexible board. In this case, it is preferable to form a cut or a hole on the back light transmission plate, and then to position the LED by inserting in it. Moreover, it is preferable to position several LEDs on the spur to obtain a uniform light which transmits to the back light transmission plate.

As explained above, for a liquid crystal display device in the present invention, because both back light type and front light type structures can be assembled with a same board and because the same device box to put the unit in can be used, parts design and manufacturing can be versatile. Therefore, according to the present invention, a liquid crystal display device which is applicable to either a back light type or a front light type is provided.

What is claimed is:

1. A liquid crystal display device, comprising:
    a liquid crystal panel having a liquid crystal material between opposed transparent plates for displaying an image by changing the intensity of a transmitted light when a molecular sequence of the liquid crystal material is changed by an applied voltage;
    a back light transmission plate or a front light transmission plate provided in contact with the liquid crystal panel for transmitting a light for illuminating the liquid crystal panel;
    a circuit board for applying a voltage to the liquid crystal panel and having wiring patterns thereon;
    a spur comprised of a flexible extension portion that projects from the circuit board as a single unit and having wiring patterns thereon; and
    a luminous body that is connected to a wire on the spur for emitting light;
    wherein a back light display unit is formed by stacking the circuit board, the back light transmission plate, and the liquid crystal panel successively from the bottom, or a front light display unit is formed by stacking the circuit board, the liquid crystal panel, and the front light transmission plate successively from the bottom, and by bending the spur so that the luminous body faces the back light transmission plate or the front light transmission plate so that the luminous body is maintained at a position where light emitted by the luminous body is transmitted to the back light transmission plate or the front light transmission plate.

2. A liquid crystal display device according to claim 1; further comprising an assisted light transmission body connected to the back light transmission plate or the front light transmission plate and facing the luminous body, such that light is transmitted from the luminous body to the assisted light transmission body and from the assisted light transmission body to the back light transmission plate or the front light transmission plate.

3. A liquid crystal display device according to claim 1; wherein the circuit board is a laminated body having a film-like substrate and a conductor to form the wiring patterns, and the spur is molded together with the board as one body.

4. A liquid crystal display device according to claim 1; wherein the circuit board and the spur are soldered together to form one body.

5. A liquid crystal display device according to claim 1; wherein the device is configured so that the back light display unit and the front light display unit can be accommodated into the same size and thickness opening of a device.

6. A liquid crystal display device according to claim 1; wherein the luminous element comprises one of a light emitting diode, a light bulb, a semiconductor laser, a fluorescent tube, or an organic or inorganic electroluminescent element.

7. A liquid crystal display device according to claim 1; wherein the circuit board comprises a flexible circuit board and the spur comprises a projection extending from a substantially rectangular portion thereof.

8. An assembly for a liquid crystal display device, comprising: a light emitting element; a light transmission plate for transmitting light emitted by the light emitting element outward of a surface thereof; and a circuit board having wiring patterns thereon for connecting the liquid crystal panel to external circuitry, the circuit board having a flexible extension portion projecting therefrom with a connecting wire for connecting to the light emitting element; whereby either a backlit display or a frontlit display can be formed using the assembly.

9. An assembly for a liquid crystal display device according to claim 8; further comprising a liquid crystal panel disposed adjacent the surface of the light transmission plate.

10. An assembly for a liquid crystal display device according to claim 8; wherein the light transmission plate transmits light from the light emitting element to a front surface thereof to illuminate a liquid crystal panel disposed adjacent the front surface.

11. An assembly for a liquid crystal display device according to claim 8; wherein the light transmission plate transmits light from the light emitting element to a rear surface thereof to illuminate a liquid crystal panel disposed adjacent the rear surface.

12. An assembly for a liquid crystal display device according to claim 8; wherein the light emitting element comprises one of an LED, a light bulb, a semiconductor laser, a fluorescent tube, or an organic or inorganic electroluminescent element.

13. An assembly for a liquid crystal display device according to claim 8; further comprising a light transmission body interposed between the light emitting element and the light transmission plate.

14. An assembly for a liquid crystal display device according to claim 13; wherein the light transmission body has one of a tapered surface, a curved surface, a rod shape, or a rectangular parallelepiped shape.

* * * * *